United States Patent [19]
Levy et al.

[11] Patent Number: 5,557,890
[45] Date of Patent: Sep. 24, 1996

[54] DOOR TRIM ASSEMBLY

[75] Inventors: Claude Levy, Houilles; Jean-Claude Smadja; Pierre Opman, both of Neuilly Sur Seine, all of France

[73] Assignee: Technistan, Courbevoie, France

[21] Appl. No.: 116,498

[22] Filed: Sep. 7, 1993

[51] Int. Cl.⁶ ........................................... B60J 5/04
[52] U.S. Cl. ................................................ 49/502
[58] Field of Search ..................... 49/440, 441, 502; 296/146.2, 146.5

[56] References Cited

U.S. PATENT DOCUMENTS

| | | | |
|---|---|---|---|
| 3,139,303 | 6/1964 | Schutte | 296/146.2 |
| 4,348,046 | 9/1982 | Ohya | 49/502 X |
| 4,605,260 | 8/1986 | Sakakibara et al. | 296/146.2 X |
| 4,651,470 | 3/1987 | Imura et al. | 49/502 |
| 4,800,681 | 1/1989 | Skillen et al. | |
| 4,953,331 | 9/1990 | Ziegler et al. | |
| 4,969,295 | 11/1990 | Nishikawa et al. | 296/146.2 X |
| 5,003,792 | 4/1991 | Mesnel | |
| 5,095,656 | 3/1992 | Keys | |
| 5,136,773 | 8/1992 | Mesnel | |

FOREIGN PATENT DOCUMENTS

| | | | |
|---|---|---|---|
| 0333993 | 9/1989 | European Pat. Off. | |
| 0376764 | 7/1990 | European Pat. Off. | |
| 0384852 | 8/1990 | European Pat. Off. | |
| 0380398 | 8/1990 | European Pat. Off. | |
| 0412782 | 2/1991 | European Pat. Off. | |
| 434552 | 6/1991 | European Pat. Off. | 49/502 |
| 73726 | 6/1978 | Japan | 49/502 |

Primary Examiner—Jerry Redman
Attorney, Agent, or Firm—Hayes & Reinsmith

[57] ABSTRACT

The present invention relates to an automobile vehicle door trim assembly, comprising in one piece, obtained by moulding on an upright, at least one of the elements chosen from the group constituted by at least one lower sealing band forming mobile window scraper, a mobile window run channel, a peripheral seal possibly tightening on a fixed panel, a finishing coating for said upright, covers for the connections with elements added upon assembly.

5 Claims, 6 Drawing Sheets

DOOR TRIM ASSEMBLY

FIELD OF THE INVENTION

The present invention relates to a trim assembly in one piece, ready to mount on an automobile vehicle door, as well as to a process for manufacturing such an assembly.

BACKGROUND OF THE INVENTION

Up to the present time, the various elements for trimming a car door were mounted separately. This is particularly the case for the upright of a mobile window, the mobile window run channel, the horizontal sealing band forming lower mobile window scraper, as well as the fixed panel or fixed window whose contour is generally provided with a seal. Now, all these elements present more or less precise dimensions due to the dispersed manufacturing sites.

Under these conditions, assembly of the elements is statically overdetermined and raises problems of adjustment requiring manual intervention which is long and laborious.

In fact, it is the pinching of the peripheral fixed window seal by fitting in the door frame which provokes application of the lateral lips on said window to tighten thereon and thus obtain seal of the system.

Moreover, the differences in the dimensions and the manufacturing defects for each of the elements have detrimental consequences on the tightness and aesthetic appearance of the whole.

It is an object of the present invention to solve these technical problems satisfactorily.

SUMMARY OF THE INVENTION

This object is attained, according to the invention, by means of an automobile vehicle door trim assembly, comprising in one piece, obtained by moulding on an upright, at least one of the elements chosen from the group constituted by at least one lower sealing band forming mobile window scraper, a mobile window run channel, a peripheral seal possibly tightening on a fixed panel, a finishing coating for said upright, covers for the connections with elements added upon assembly.

According to an advantageous feature, said upright comprises at its lower end and possibly at its upper end, fastenings for fixation to the inner wall of the door.

According to one embodiment, said peripheral seal of said fixed panel is fast on one of its sides with said upright.

According to another feature, said lower sealing band is connected to said fixed panel seal in the lower part of said upright by an elastic articulation.

According to a further feature, said assembly comprises a lower sealing band intended to be mounted outside the car interior and a lower sealing band intended to be mounted inside said car interior with respect to said mobile window.

According to yet another advantageous feature, said peripheral fixed panel seal comprises on its outer contour short supple lips to facilitate assembly and fastening on the door rabbet as well as lateral sealing lips.

The invention allows rapid, automatic trim of the door by mounting an assembly in one piece. Moulding of the peripheral seal directly on the fixed window makes it possible to obtain a satisfactory seal from manufacture. The lateral sealing lips ensure only the tightness between the peripheral seal and the frame of the door. These accessory lips being supple, they allow a more precise positioning of the assembly and eliminate the deformations due to the compressions or elongations of the peripheral seal.

Moreover, the assembly of the invention allows uniformization of the style by the choice of the same component elements. The overall seal as well as sound insulation are increased, all the more so as the sliding window upright may be protected by being covered, from manufacture of the assembly, by an insulating material.

Another advantage follows from the fact that the elements constituting the assembly are added by moulding and may therefore present diverse and varied characteristics (hardness, rigidity, tint . . . ).

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
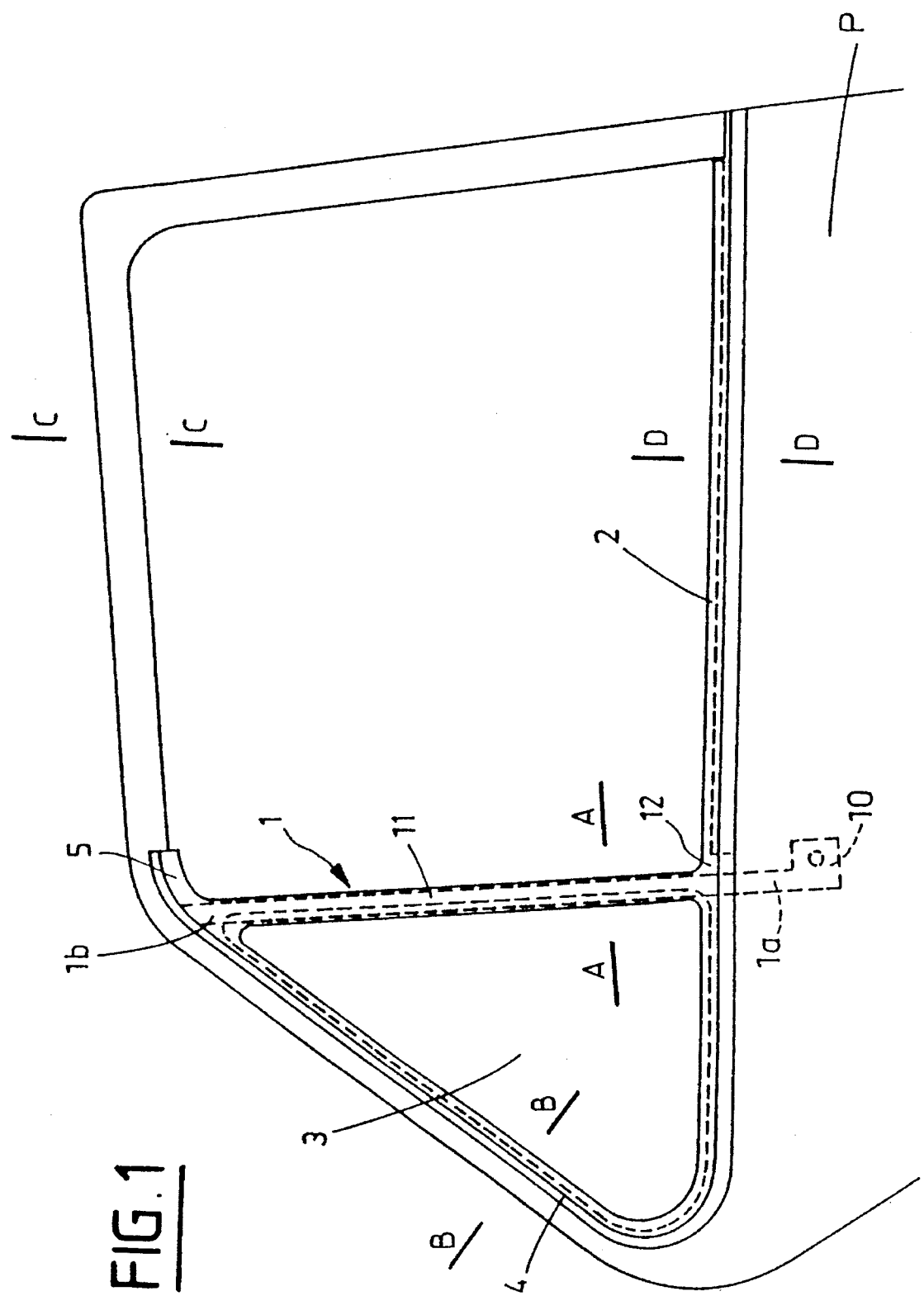
FIG. 1 shows a side view of a trim assembly according to the invention, mounted on a vehicle rear door P.

Referring now to the drawings, the trim assembly shown in FIG. 1 comprises in one piece a fixed upright 1 for sliding window (not shown), a substantially horizontal sealing band 2 forming sliding window scraper, a fixed window panel 3 provided on its peripheral edge with a seal 4 fast on its inner edge with said upright 1.

The lower part of the fixed upright 1 extends downwardly below the level of the band 2 to be inserted in the lining of the door.

The fixed upright 1 comprises at its lower end 1a and possibly at its upper end 1b, fastenings 10 for fixation to the inner wall of the lining of door P.

The assembly may be adapted to be mounted either on a front door, in which case the fixed panel is a rearview mirror gusset support (plastic cover), a front fixed window or both; or on a rear vehicle door, in which case the fixed panel is a non-opening side window or a gusset trim.

The band 2, the fixed window 3 and the peripheral seal 4 are connected by moulding around and with the fixed upright 1.

The connection between the band 2 and said peripheral seal 4 and/or the upright 1 advantageously comprises a supple, elastic articulation 12 to facilitate assembly, allowing clearance of the band 2.

The assembly is then mounted by fitting the lower part of the upright 1 in the lining of door P and application then translation of the assembly in the front or rear triangle of the door.

The upright 1 may be protected by an outer finishing coating 11 obtained by direct moulding at the moment of manufacture of the assembly with possible integration of a reinforcing insert.

The assembly of the invention shown in FIG. 1 also comprises a cover 5 for the connection, subsequent to assembly, with the upper run channel for sliding window when the latter is made in independent form.

The cover 5 is constituted by a tongue covering the contiguous edges of the upright 1 and the upper run channel.

Figure 5A:
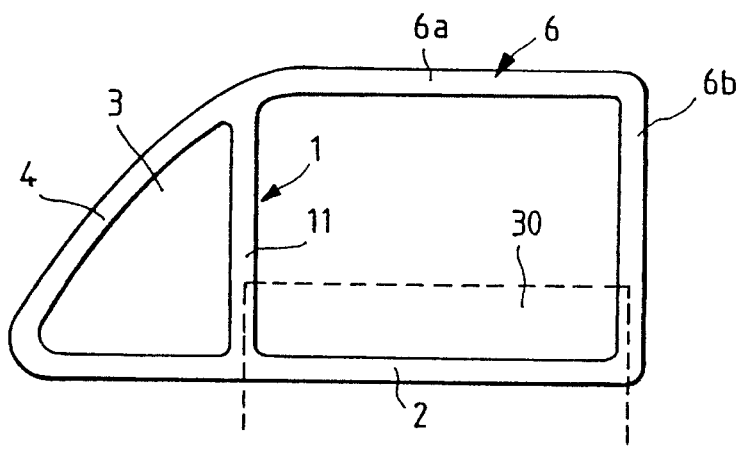
FIGS. 5a, 5b, 5c show other embodiments of the invention.
Figure 5B:
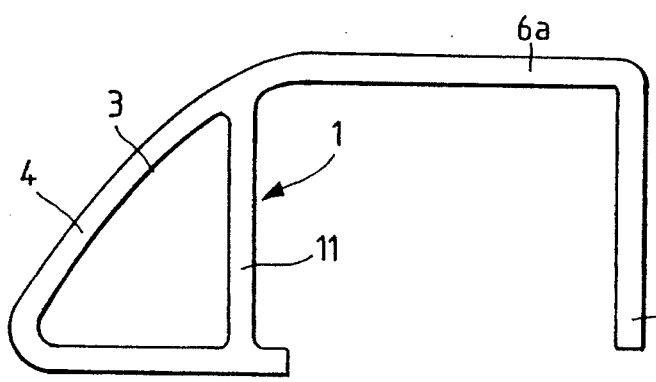
Figure 5C:
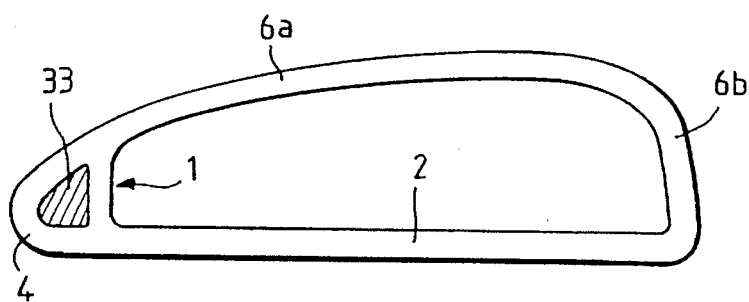

The front triangle of the fixed panel 3 may be provided with an element for fixing an outside rearview mirror or the upright 1 will itself constitute a rearview mirror support (cf. FIG. 5c).

The appearance of the moulded sections will be rendered uniform by prior treatment of the manufacturing moulds.

Figure 2:
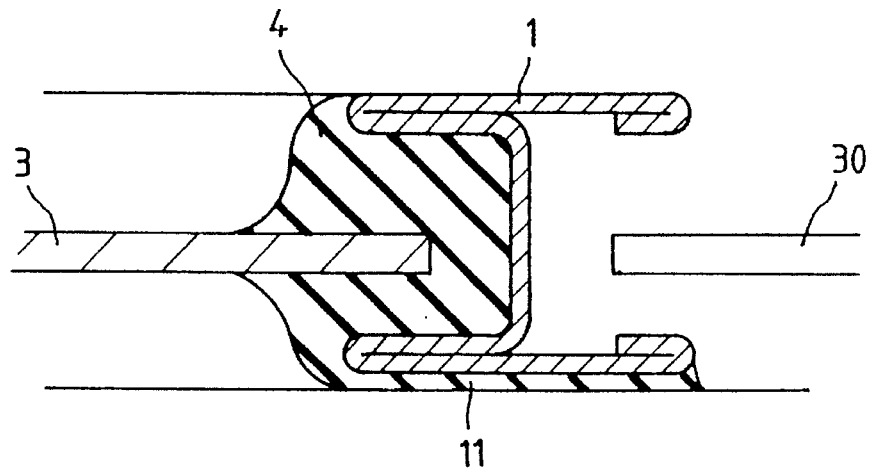
FIG. 2 is a view in section at the level of the upright of the assembly of FIG. 1 taken generally along line A—A.

FIG. 2 shows a view in section along A—A, at the level of the upright 1, of the assembly of FIG. 1.

The assembly comprises at that spot the fixed upright 1 provided on its face outside the interior of the vehicle, with the finishing coating 11 and fast, on the side of the fixed window 3, with the peripheral seal 4 tightening on said fixed window 3 and surrounds on the other side the front vertical edge of the sliding window 30.

Figure 3:
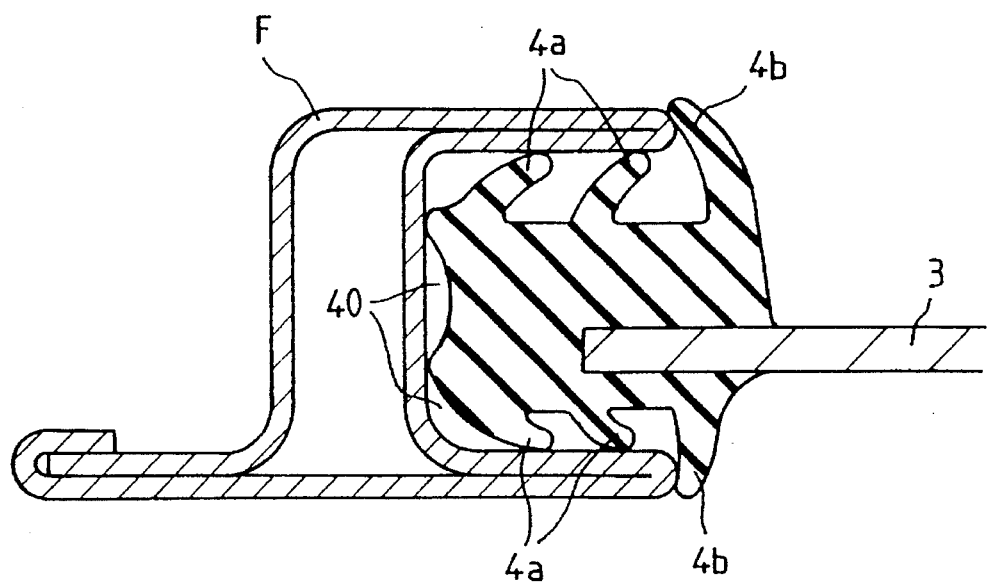
FIG. 3 is a view in section at the level of the fixed window seal of the assembly of FIG. 1 taken generally along line B—B.

FIG. 3 shows a view in section along B—B, at the level of the peripheral seal 4 of the fixed window 3.

Said seal 4 comprises on its outer contour short supple lips 4a to facilitate assembly and fastening on the rabbet F of the door P and lateral lips 4b reinforcing seal. The spaces 40 included between the different lips 4a, 4b define buffer zones to stop or limit the propagation of the acoustic waves, thus procuring a better sound insulation of the interior.

Figure 4:
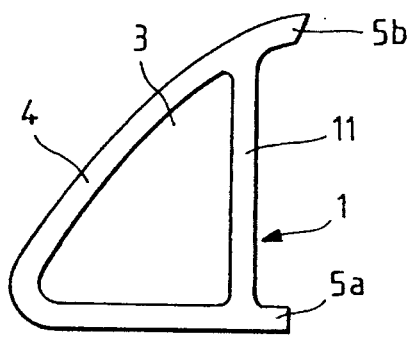
FIG. 4 shows another embodiment of the trim assembly according to the invention.

FIG. 4 shows another embodiment of the trim assembly of the invention comprising only an upright 1 with its finishing coating 11, a peripheral seal 4 tightening on a fixed window 3 and lower (5a) and upper (5b) covers for the connections with a scraper and an upper mobile window run channel, respectively.

The scraper and upper run channel are in that case made independently of the trim assembly shown, and mounted separately.

FIG. 5a shows another embodiment, likewise comprising, in one piece, an upright 1 with its finishing coating 11, a peripheral seal 4 tighening on a fixed window 3, a run channel 6 for sliding window 30 and a lower sealing band 2 forming sliding window scraper.

The run channel 6 comprises an upper portion 6a and a lateral portion 6b. It may also be provided that the run channel 6 presents another lateral portion 6c symmetrical to portion 6b engaged in the corresponding part of the upright 1 to reinforce the seal between the lateral edge of the sliding window 30 and said upright 1 (cf. FIG. 6b).

FIG. 5b corresponds to an embodiment substantially identical to that of FIG. 5a, but without the lower sealing band.

FIG. 5c corresponds to an embodiment with a fixed panel 33 of reduced dimensions, essentially intended for fixing a rearview mirror member.

In this latter case, the upright 1 may be made of the same material as said panel 33, and even be integral therewith.

Figure 6A:
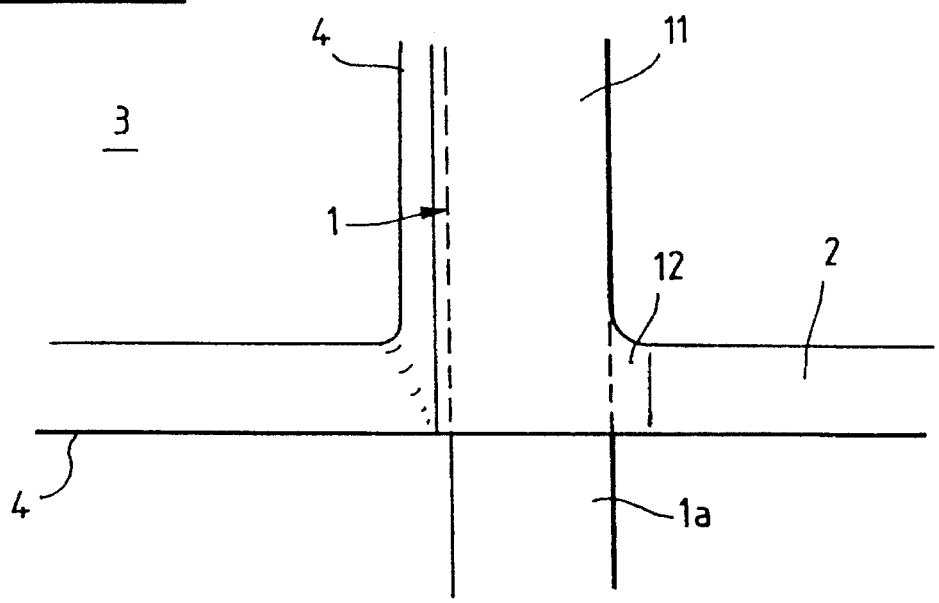
FIGS. 6a and 6b show detailed views of the assembly of the invention.
Figure 6B:
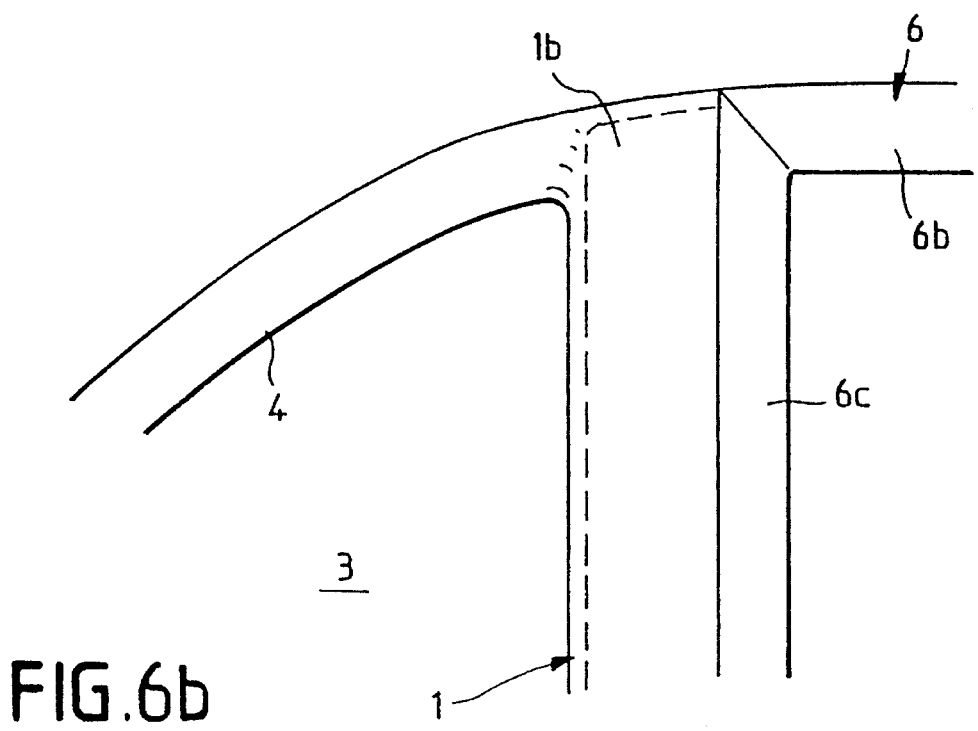

FIGS. 6a and 6b show detailed views with connections respectively between the lower part 1a and the upper part 1b of the upright 1 and the other co-moulded elements described previously. In FIGS. 6a and 6b, it appears that the outside appearance of the connections presents no defect or irregularity due to the assembly in one piece by moulding all the elements 2, 4, 6, 11 on the upright 1.

Figure 7:
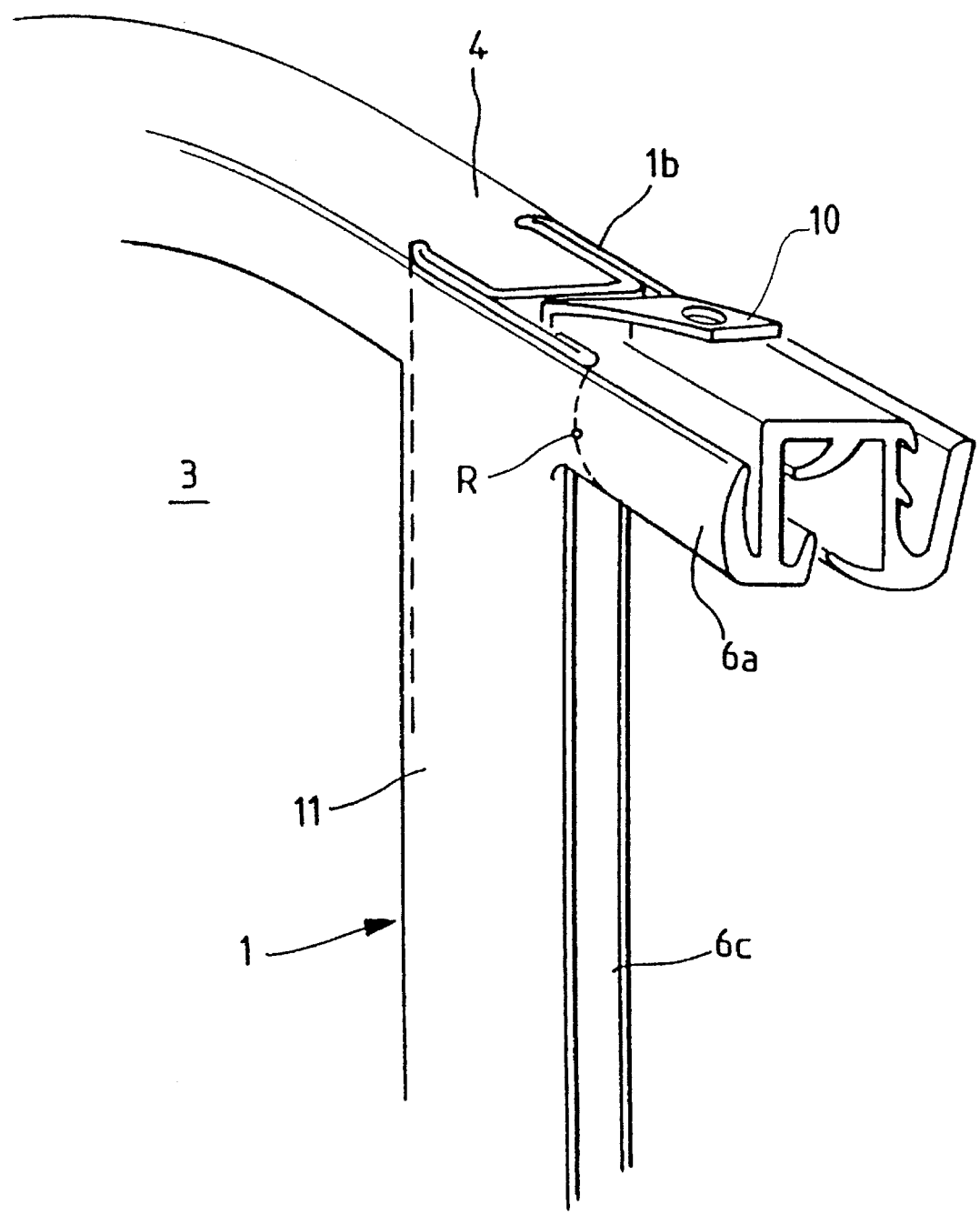
FIG. 7 is a perspective view partly in section at the level of the run channel provided in FIGS. 5a to 5c.

FIG. 7 shrews a view in section along C—C of the run channel 6 at the level of the upper portion 6a.

The transverse section of the run channel 6 presents a conventional profile and the upper part 1b of the upright 1 comprises a fastening 10 for fixation.

Figure 8:
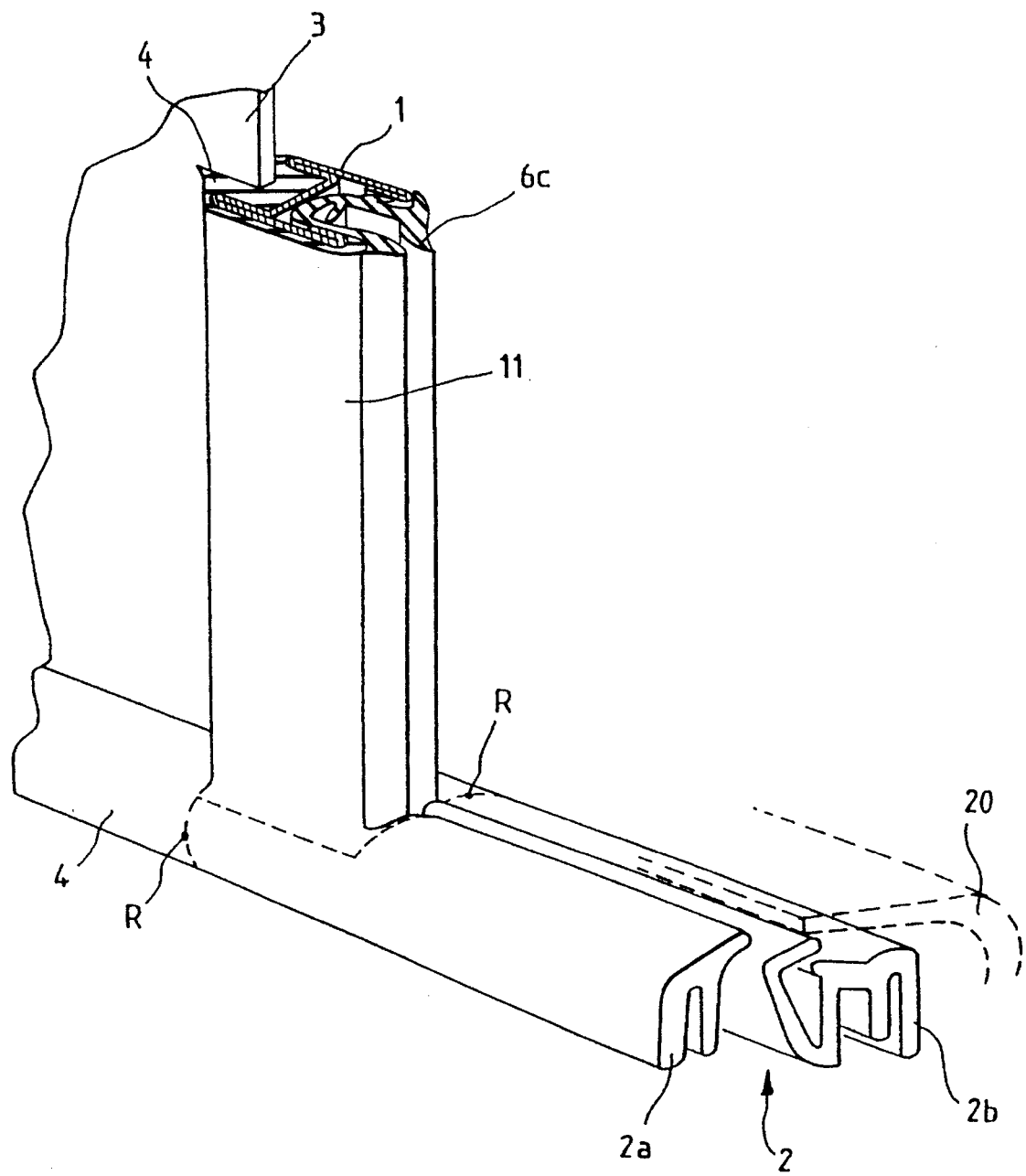
FIG. 8 is a view in section at the level of the seal forming scraper.

In FIGS. 7 and 8, the connections R between the various co-moulded elements appear in broken lines.

FIG. 8 shows a view in section along D—D of the lower sealing bands 2a and 2b forming sliding window scrapers. Band 2a is intended to be mounted outside the car interior whilst band 2b is intended to be mounted inside said interior. In that case, the sliding window 30 moves between bands 2a and 2b and upon contact therewith.

Band 2b may receive an inner trim 20, superposed thereon.

The transverse sections of bands 2a and 2b present conventional profiles.

What is claimed is:

1. An automobile vehicle door trim assembly comprising a unitary body of one-piece construction, obtained by moulding around and with both an upright and a fixed panel, a peripheral seal for connection to at least one of the elements chosen from the group constituted by at least one lower sealing band forming a mobile window scraper, a mobile window run channel, a finishing coating for said upright, and covers for connections with elements added upon assembly, and wherein said lower sealing band is connected to said fixed panel seal by an elastic articulation.

2. An automobile vehicle door trim assembly comprising a unitary body of one-piece construction, obtained by moulding around and with both an upright and a fixed panel, a peripheral seal for connection to at least one of the elements chosen from the group constituted by at least one lower sealing band forming a mobile window scraper, a mobile window run channel, a finishing coating for said upright, covers for connections with elements added upon assembly, a lower sealing band for exterior mounting with respect to said mobile window run channel, and a lower sealing band for interior mounting with respect to said mobile window run channel.

3. An automobile vehicle door trim assembly comprising a unitary body of one-piece construction, obtained by moulding around and with both an upright and a fixed panel, a peripheral seal for connection to at least one of the elements chosen from the group constituted by at least one lower sealing band forming a mobile window scraper, a mobile window run channel, a finishing coating for said upright, and covers for connections with elements added upon assembly, said fixed panel forming a rearview mirror support.

4. An automobile vehicle door trim assembly comprising a unitary body of one-piece construction, obtained by moulding around and with both an upright and a fixed panel, a peripheral seal for connection to at least one of the elements chosen from the group constituted by at least one lower sealing band forming a mobile window scraper, a mobile window run channel, a finishing coating for said upright, and covers for connections with elements added upon assembly, wherein said peripheral seal tightening on said fixed panel comprises on its outer contour short supple lips to facilitate assembly and fastening on a door rabbet, as well as lateral sealing lips.

5. An automobile vehicle door trim assembly comprising a unitary body of one-piece construction, obtained by moulding around and with both an upright and a fixed panel, a peripheral seal for connection to at least one of the elements chosen from the group constituted by at least one lower sealing band forming a mobile window scraper, a mobile window run channel, a finishing coating for said upright, and covers for connections with elements added upon assembly, and wherein said lower sealing band is connected to a lower part of said upright by an elastic articulation.

* * * * *